(12) United States Patent
Zuch

(10) Patent No.: US 6,838,622 B2
(45) Date of Patent: Jan. 4, 2005

(54) ELECTRICAL LEAD-THROUGH BUSHING AND SYSTEM WITH THE ELECTRICAL BUSHING

(75) Inventor: Gerhard Zuch, Fürth (DE)

(73) Assignee: Framatome ANP GmbH, Erlangen (DE)

(*) Notice: Subject to any disclaimer, the term of this patent is extended or adjusted under 35 U.S.C. 154(b) by 0 days.

(21) Appl. No.: 10/431,421

(22) Filed: May 7, 2003

(65) Prior Publication Data

US 2004/0026110 A1 Feb. 12, 2004

(30) Foreign Application Priority Data

May 7, 2002 (DE) .......................... 102 20 478

(51) Int. Cl.[7] .................................................. H02G 3/00
(52) U.S. Cl. ............. 174/100; 174/14 BH; 174/11 BH; 324/643; 73/290 R
(58) Field of Search .......................... 174/100, 14 BH, 174/28, 11 BH, 142, 152 R, 151; 73/290 R; 324/643

(56) References Cited

U.S. PATENT DOCUMENTS

| 3,803,531 | A |   | 4/1974  | Sorensen |  |
|-----------|---|---|---------|----------|--|
| 3,909,500 | A |   | 9/1975  | Bereza et al. |  |
| 4,142,937 | A |   | 3/1979  | Eyral et al. |  |
| 4,281,209 | A | * | 7/1981  | Yoshioka et al. ......... 174/14 R |
| 4,440,970 | A | * | 4/1984  | Dale ........................ 174/14 R |
| 4,554,399 | A | * | 11/1985 | Cookson ................... 174/14 R |
| 4,786,857 | A |   | 11/1988 | Mohr et al. |
| 4,965,407 | A | * | 10/1990 | Hamm ...................... 174/31 R |
| 5,173,640 | A |   | 12/1992 | Geisler et al. |
| 5,726,390 | A | * | 3/1998  | Schweppe et al. .......... 174/142 |
| 6,610,933 | B2 | * | 8/2003 | Baker et al. ................ 174/142 |

FOREIGN PATENT DOCUMENTS

| DE | 40 37 091 A1 | 5/1992 |
| DE | 44 36 580 A1 | 4/1996 |
| DE | 199 58 584 C1 | 2/2001 |
| DE | 100 58 026 A1 | 5/2002 |
| JP | 56-39494 | 4/1981 |
| WO | 98/05931 | 2/1998 |

* cited by examiner

Primary Examiner—Dhiru R. Patel
(74) Attorney, Agent, or Firm—Laurence A. Greenberg; Werner H. Stemer; Gregory L. Mayback

(57) ABSTRACT

An electrical lead-through bushing with an internal conductor surrounded by an external conductor, extending together through a flange element, is particularly suitable for a TDR (time domain reflectometry) measuring system in which the fill level in a reactor pressure vessel of a nuclear installation is monitored. The bushing is particularly suitable for use on a vessel wherein comparatively high pressures and/or high temperatures may prevail. For this purpose, a first space region, formed on a first side of the flange element between the internal conductor and the external conductor surrounding it, is sealed off with respect to a second space region, formed on a second side of the flange element by the internal conductor and the external conductor surrounding it, by way of a number of sealing rings.

10 Claims, 2 Drawing Sheets

ELECTRICAL LEAD-THROUGH BUSHING AND SYSTEM WITH THE ELECTRICAL BUSHING

BACKGROUND OF THE INVENTION

Field of the Invention

The invention relates to an electrical lead-through bushing with an internal conductor surrounded by an external conductor, which are led through a flange element. The invention also relates to a combination wherein the bushing is utilized.

Bushings of this general type, which are usually also referred to as "coaxial bushings" or "coaxial lead-through bushings," are usually used to transmit electrical signals or pulses from a first space region into a second space region, which is separated from the first space region for example by a wall or shielding. The wall or shielding may thereby have in particular an opening through which the electrical lines provided for passing on the signal or pulse are led, and which can be closed by a flange element. Usually provided in this case in the region of this flange element are an internal conductor and an external conductor surrounding the latter, which pass through the flange element and consequently establish an electrical connection from a first side of the flange element to the second side of the flange element.

Such bushings may be significant in particular if the leading-in and/or out of electrical signals or pulses into the interior of an actually completely enclosed vessel is desirable or required, for example for diagnostic or monitoring purposes. An example of such an application is the so-called TDR measuring principle (TDR, time domain reflectometry), which can be used for determining or monitoring the position of a boundary layer between two media or two phases, in particular for ascertaining a fill level, in a vessel. The TDR measuring principle is described, for example, in German patent DE 199 58 584 C1 and in U.S. Pat. No. 4,786,857.

In a TDR measurement process, which is used in particular whenever the vessel cannot be inspected in some other way, and consequently the characteristic positional value of the boundary layer or of the filling level cannot be determined directly, use is made of the effect that an electromagnetic pulse carried in an antenna system is partly reflected when the impedance between, for example, a central conductor of the antenna and an external conductor surrounding the latter in the manner of a coaxial cable changes abruptly. Such an abrupt change of the impedance occurs, for example, wherever the antenna formed in such a manner is immersed from a gaseous environment into a liquid, since the impedance depends on the capacitance between the central conductor or internal conductor and the external conductor, and consequently depends on the dielectric constant of the medium filling the intermediate space between the central conductor and the external conductor. An electromagnetic pulse supplied to such an antenna which has been immersed into the medium to be monitored is consequently partly reflected at the surface of the medium. A further reflection occurs at the, usually short-circuited, end of the antenna. Since the propagation velocity of the electromagnetic pulse in the antenna is otherwise known, the difference in the delay time between the pulse reflected at the boundary layer and the pulse reflected at the end of the antenna can be used as a measure of the position of the boundary layer, and consequently as a means for ascertaining a characteristic positional value that is characteristic of the position of the boundary layer. It is thereby possible to take as a basis a substantially proportional relationship between the difference in delay time and the characteristic positional value.

To allow this method to be used for the diagnosis or monitoring of a medium in a closed vessel, for example, the transmission of electromagnetic pulses from the outside into the interior of the vessel and vice versa is consequently required. On the other hand, however, depending on the type and properties of the medium kept in the vessel, it may be absolutely necessary, or at least very important, to ensure a particularly high degree of sealing integrity of the vessel. Depending on the operating parameters prevailing in the vessel according to the design, such as for example the pressure and temperature of the medium kept there, particularly demanding requirements are consequently to be imposed in an individual case on the electrical bushing used for leading electromagnetic pulses in and out. This may have the effect that, for example, the TDR measuring principle cannot be used at all under certain circumstances and for certain media.

SUMMARY OF THE INVENTION

It is accordingly an object of the invention to provide an electrical lead-through and an implementation of the lead-through which overcome the above-mentioned disadvantages of the heretofore-known devices and methods of this general type and which is also suitable for use on a vessel wherein comparatively high pressures and/or temperatures may prevail according to the design.

With the foregoing and other objects in view there is provided, in accordance with the invention, an electrical lead-through bushing, comprising:

a flange element having a first side and a second side;

an internal conductor and an external conductor surrounding the internal conductor together extending through the flange element;

the internal conductor and the external conductor surrounding the internal conductor defining a first space region on the first side of the flange element and a second space region on the second side of the flange element; and a plurality of sealing rings sealing the first space region off with respect to the second space region.

In other words, the objects of the invention are attained in that a first space, formed on a first side of the flange element between the internal conductor and the external conductor, is sealed off with respect to a second space, formed on a second side of the flange element between the internal conductor and the external conductor surrounding it, with a number of sealing rings.

The term "flange element" is to be understood here as meaning generally a piece of wall or the like, which in particular is formed in a mobile manner and is provided in the manner of a cover or plug for closing an opening. For example, it may also be a probe head or lance head of the in-core instrumentation of a nuclear power plant.

The invention is in this case based on the consideration that, for the bushing to be able to be reliably used even on a vessel in the interior of which comparatively extreme operating conditions may exist, particularly demanding requirements with regard to the sealing integrity should be met in the case of the actual bushing. With regard to the external conductor led through the flange element, this is comparatively less problematical, since it can be continuously connected in its cross section to the flange element, and in particular can be formed integrally with the latter. Special care is called for, however, in the case of leading the internal conductor through the flange element, since, for the internal conductor, electrical contact with the flange element or the external conductor is to be reliably avoided for undistorted and faultless transmission of the electromagnetic pulses. Since such a reliable electrical insulation between the internal conductor and the flange element or the external conductor necessarily entails the formation of air gaps or open space regions, reliable sealing is particularly significant in this region. Filling of the created air or space regions with a moldable sealant or by other flowing techniques, such as soldering for example, is generally envisaged for reliable sealing. In order, however, to ensure reliable sealing integrity of the system even in the case of comparatively extreme operating parameters, the use of mechanically based seals is envisaged as a departure from the use of flowing sealants.

A particularly good sealing effect can be achieved in this case by the sealing rings having a suitably chosen deformability when they are subjected to external force. This can be achieved at the same time as particularly high temperature resistance of the seal overall by metal sealing rings preferably being provided as the sealing rings. In this case, they may in particular be gold-plated high-grade steel rings.

When such an electrical bushing is used, it is also necessary for the internal conductor led through the flange element to be carefully insulated from the flange element and/or from the external conductor under varying operating conditions. To ensure this, the internal conductor should be spatially fixed in a special way in the very region where it passes through the flange element. For this purpose, the internal conductor is advantageously prestressed by the flange element in the region where it passes through. In a further advantageous configuration, the means for applying the prestress are in this case supported on the flange element on the force side by means of a number of ceramic rings, so that the insulation of the internal conductor from the flange element is ensured in a particularly reliable way.

The electrical bushing is expediently designed especially for use in a so-called TDR measuring system. In the case of such a measuring system, it is particularly important that the electromagnetic pulses transmitted via the electrical bushing from the exterior of the respective vessel into its interior are reflected to the least possible extent at the bushing itself. To ensure this, depending on the respective position in the longitudinal direction of the internal conductor and external conductor of the electrical bushing, the external and internal conductors are advantageously dimensioned in their cross section in each case in such a way that the impedance of the conductor system formed by them in the direction of their respective longitudinal axis is substantially constant.

The electrical bushing is advantageously used in a measuring system for ascertaining the characteristic positional value of a boundary layer according to the TDR method (time domain reflectometry). In a particularly advantageous configuration, use of the electrical bushing is envisaged in a TDR measuring system for ascertaining the filling level in a reactor pressure vessel of a nuclear insulation. This is because, precisely in such a reactor pressure vessel, particularly high pressures and temperatures prevail, so that the use of a TDR measuring system for filling level monitoring is possible only to a restricted extent. The use of the electrical bushing now provided consequently makes it possible for the first time to use the TDR measuring principle for filling level monitoring in the reactor pressure vessel at all its operating points.

The advantages achieved by the invention are, in particular, that a particularly high temperature and pressure resistance of the electrical bushing can be achieved overall by the use of mechanical sealing elements for sealing the bushing of the internal conductor. By applying a suitable prestress, in particular in combination with the ceramic rings used here, the maintenance of great sealing integrity of the bushing is ensured, even when there are varying temperature or pressure conditions, without impairing the insulating effect of the internal conductor with respect to the flange element or the external conductor. Consequently, on account of its comparatively great temperature and pressure resistance, the electrical bushing is especially suitable for use in a TDR measuring method, in particular for the monitoring of operating parameters in a vessel under comparatively extreme conditions, such as for example for the filling level monitoring in a reactor pressure vessel.

Other features which are considered as characteristic for the invention are set forth in the appended claims.

Although the invention is illustrated and described herein as embodied in an electrical bushing and use of the electrical bushing, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
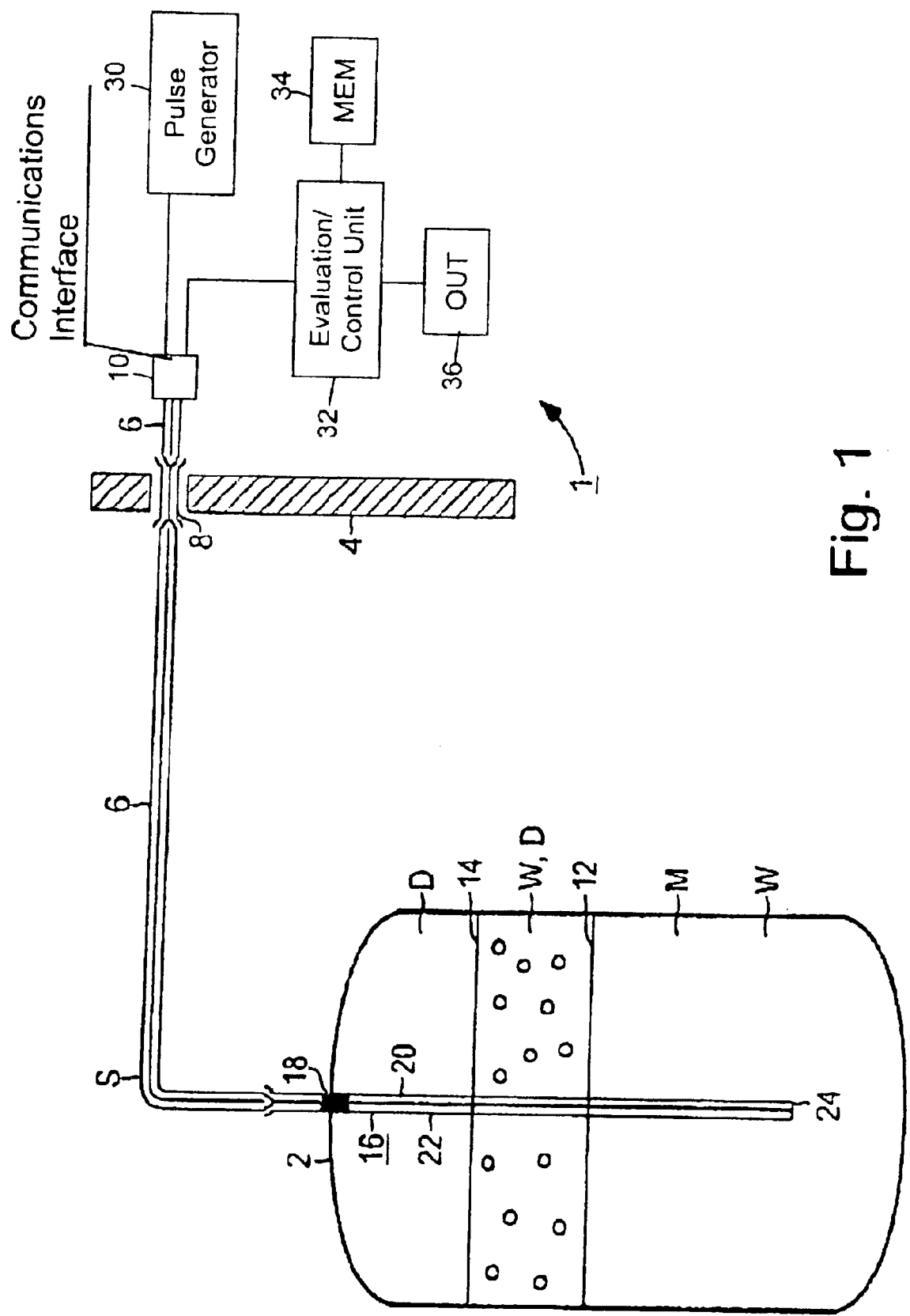
FIG. 1 is a schematic diagram of a system according to the invention for monitoring the filling level in a closed reactor pressure vessel.

Referring now to the figures of the drawing in detail and first, particularly, to FIG. 1 thereof, there is shown a system 1 for monitoring a medium M within the reactor pressure vessel 2 of a nuclear installation. The reactor pressure vessel 2 is arranged within a containment 4, which is closed around the vessel 2. For simplicity and clarity, the containment 4 is merely indicated with a partial wall in FIG. 1. For the suitable exchange of signals S, the reactor pressure vessel 2 is connected to a communications interface 10 of the system 1 by means of a signal line 6, which is led through the containment 4 via a bushing 8.

The medium M in the reactor pressure vessel 2 in the exemplary embodiment is water W, which serves as the primary coolant of the nuclear installation. In a lower space region, the water W is unmixed, in the so-called supercooled state. In a space region lying above that, wherein there is a heating effect of the nuclear fuel assemblies inside the reactor pressure vessel 2, there is on the other hand a phase mixture W, D between water W and vapor bubbles D forming therein. In the region lying still farther above that, on the other hand, there is exclusively evaporated primary coolant, that is to say exclusively steam D. The medium M kept in the vessel 2 consequently has a first boundary layer 12 between the water W and the phase mixture W, D and a second boundary layer 14 between the phase mixture W, D and the steam D.

When operating the nuclear installation, the monitoring of a great variety of operating parameters is envisaged. In this respect it may also be desirable or necessary, inter alia, to monitor the position of the boundary layer 12, 14. For example, monitoring of the boundary layer 14, the position of which is also referred to as the "swell level," may be performed by means of a fill level measurement.

The system 1 is intended for the real-time ascertainment and monitoring of characteristic positional values of the boundary layers 12, 14. For this purpose, the system 1 is designed for use of the so-called TDR measuring principle (time-domain reflectometry). For such a TDR measurement, an antenna 16 is provided inside the reactor pressure vessel 2. The antenna 16 is oriented in a substantially vertical direction. The antenna 16, which is led out from the reactor pressure vessel 2 via an electrical bushing 18 and is connected to the signal line 6, is in this case constructed as a coaxial antenna. It comprises a central conductor 20, which is concentrically surrounded in the manner of a coaxial cable by an external conductor 22 designed substantially in the form of the lateral surface of a cylinder. The external conductor 22 is in this case formed in a pierced or perforated manner and has a multiplicity of equalizing openings, which cannot be seen in the representation. It is thereby ensured that the medium M can penetrate into the intermediate space between the central conductor 20 and the external conductor 22. At the end of the antenna 24, the central conductor 20 and the external conductor 22 are short-circuited.

When such an antenna 16 is used for the positional determination of the boundary layers 12, 14, use is made of the effect that the impedance of the antenna 16 depends locally on the respective capacitance between the central conductor 20 and the external conductor 22. The impedance is consequently dependent via the capacitance on the dielectric constant of that medium M which fills the intermediate space between the central conductor 20 and the external conductor 22. On passing through one of the boundary layers 12, 14, the local impedance of the antenna 16 changes abruptly. In the case of such an abrupt change in impedance, an electromagnetic pulse carried in the antenna 16 is partly transmitted and partly reflected. Consequently, such an electromagnetic pulse carried in the antenna 16 leaves behind at each boundary layer 12, 14 a reflected pulse which can be evaluated as a characteristic signature. In particular, the difference in the delay time between a pulse reflected at one of the boundary layers 12, 14 and a pulse reflected at the end of the antenna 24 can be used to ascertain a characteristic value for the position of the respective boundary layer 12 or 14 in relation to the end of the antenna 24, and consequently a characteristic value, for example for the fill level of the medium M inside the reactor pressure vessel 2, taking into account the propagation velocity of electromagnetic signals in the respective segment of the antenna 16.

To allow such positional determinations of the boundary surfaces 12, 14 to be carried out according to the TDR measuring principle, the system 1, connected to the antenna 16 via the signal line 6, configured as a shielded line, is equipped with suitable components. In particular, the system 1 comprises a pulse generator 30 for generating an electromagnetic pulse as and when required. The pulse generator 30 is connected via the communications interface 10 to the signal line 6, so that an electrical pulse generated by the pulse generator 30 can be supplied to the antenna 16 as and when required. Furthermore, the system 1 comprises an evaluation and control unit 32, which is likewise connected to the communications interface 10 and is connected on the one hand to a memory module 34 and on the other hand to an output module 36. In the exemplary embodiment, the output module may be a display screen. It goes without saying that the evaluation and control unit 32 is also connected to further components required for operation to be properly conducted.

To carry out the determination of a characteristic positional value according to the TDR principle, a pulse generated in the pulse generator 30 is supplied to the antenna 16 arranged in the interior of the reactor pressure vessel 2. Subsequently, the number of reflected pulses received via the antenna 16 is measured in a time-resolved manner. In this case, a reflected pulse assigned to the boundary layer 12 or 14 is identified in a response signal formed by the time characteristic of the pulses and is taken as a basis for the positional determination from a delay time measurement.

Figure 2:
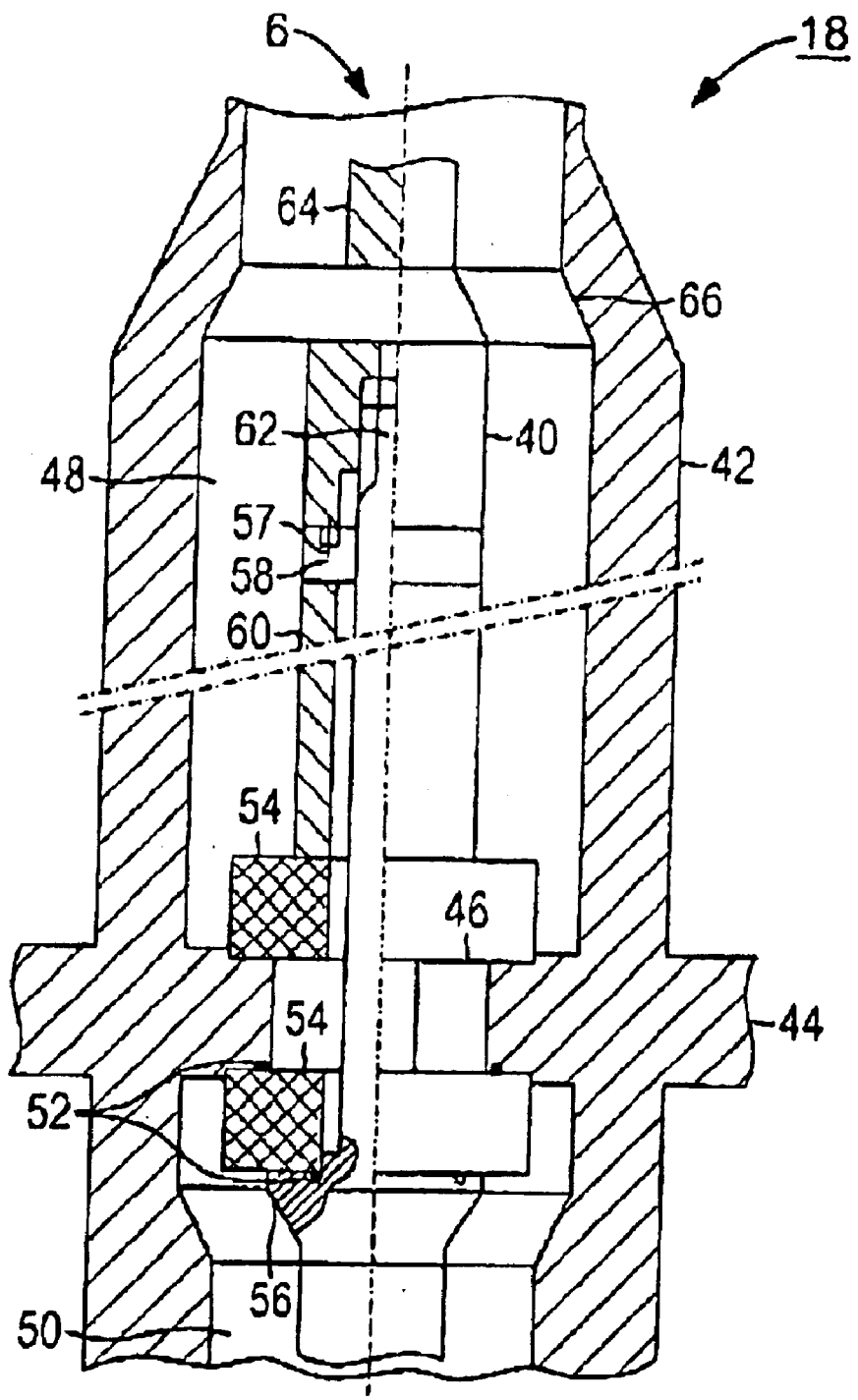
FIG. 2 is a longitudinal section of the electrical bushing according to the invention.

Reference will now be had to FIG. 2, which illustrates an electrical bushing 18 that is specifically designed for its suitability for use in a TDR measuring system for the reactor pressure vessel 2 of the nuclear installation. For this purpose, the electrical bushing 18, which for its part comprises in the manner of a coaxial bushing an internal conductor 40 and an external conductor 42 concentrically surrounding the latter, is designed for particularly great sealing integrity even when there are changing or particularly extreme pressure conditions in the interior of the reactor pressure vessel 2.

The external conductor 42 and the internal conductor 40 surrounded by it are led through a flange element 44, which for its part can be fitted in a sealing manner onto a corresponding opening in the reactor pressure vessel 2 correspondingly adapted in its dimensioning. The external conductor 42 is in this case formed integrally with the flange element 44 in the exemplary embodiment, so that, when this component is used, no sealing problems are to be expected. Alternatively, however, the external conductor 42 may also be thickened, for example, or suitably shaped in some other way, in order to seal an assigned opening in the reactor pressure vessel with a pressure-tight effect directly in the manner of a plug or a screw-in coupling. For the internal conductor 40, continuous reliable insulation from the external conductor 42 and from the flange element 44 connected to the latter must be ensured for faultless and interference-free transmission of the electromagnetic pulses. The internal conductor 40 is therefore led through an opening 46 in the flange element 44, with the formation of a peripheral air gap, in such a way that electrical contact between the internal conductor 40 and the flange element 44 is avoided continuously over them.

This configuration could, however, lead to leakages between a first space region 48, formed on a first side of the flange element 44, corresponding in the exemplary embodiment to the outer side of the reactor pressure vessel 2, by the internal conductor 40 and by the external conductor 42 surrounding it, and a second space region 50, formed on a second side of the flange element 44, corresponding in the exemplary embodiment to the inner side of the reactor pressure vessel 2, by the internal conductor 40 and the external conductor 42 surrounding it. In order to eliminate the possibility of such leakages, and consequently ensure particularly great sealing integrity of the electrical bushing 18, the first space region 48 is sealed off from the second space region 50 on the basis of mechanical sealing elements, that is by way of a number of sealing rings 52.

The sealing rings 52 are designed, in particular with regard to their choice of material, in such a way that a great sealing effect is ensured, with at the same time high temperature and pressure resistance. For this purpose, the sealing rings 52 are formed as metal sealing rings and in the exemplary embodiment consist of gold-plated or gilded high-grade steel.

In order on the one hand to enhance the sealing effect of the sealing rings 52 to a particular degree and on the other hand to ensure reliable spatial positioning of the internal conductor 40 in relation to the flange element 44, and consequently in any event ensure adequate electrical insulation, the internal conductor 40 is prestressed by the flange element 44 in the region where it passes through, the prestressing means being supported on the flange element 44 on the force side by means of a number of ceramic rings 54. On the second side of the flange element 44, corresponding to the inner side of the reactor pressure vessel 2, for this purpose the internal conductor 40 is shaped outward like a collar, with a peripheral groove being formed for receiving one of the sealing rings 52. The collar 56 formed in this way is supported on the inner side of the flange element 44 by means of the sealing rings 52 and a ceramic ring 54 lying in between, so that a force acting on the internal conductor 40 in its longitudinal direction is transferred via the sealing rings 52 and the ceramic rings 54 to the flange element 44, without an electrical connection being able to occur between the internal conductor 40 and the flange element 44. On the first side of the flange element 44, corresponding to the outer side of the reactor pressure vessel 2, on the other hand, the internal conductor 40 has at a suitable location a thread 57, which is merely indicated in FIG. 2 and on which a union nut 58 is disposed. The union nut 58 is for its part supported on the outer side of the flange element 44 on the force side by means of a spacer sleeve 60, arranged concentrically with respect to the internal conductor, and a further ceramic ring 54. By suitable tightening of the union nut 58, a prestress of the internal conductor 40 can consequently be set in the region where it passes through the flange element 44. With a suitably chosen prestress, the contact surfaces also press against the sealing rings 52 to a particular degree, so that a particularly great sealing effect can be achieved by applying the prestress, if appropriate by slight deformation of the sealing rings 52.

In its region beyond the union nut 58, the internal conductor 40 merges into a central conductor 64 of the signal line 6 via a slidingly mounted end pin 62. In this space region, the external conductor 42 may be connected to the external conductor of the signal line 6 by suitable means, for example likewise a union nut.

Apart from ensuring particularly great sealing integrity, the electrical bushing 18 is also designed on the other hand for particularly low reflections when electrical signals or pulses pass through from the first side of the flange element 44 to its second side, or vice versa. For this purpose, the components of the electrical bushing 18, that is in particular the internal conductor 40, the external conductor 42, the opening 46 and the ceramic rings 54, are dimensioned in their cross section in each case in such a way that the impedance of the conductor system formed by them in the direction of the longitudinal axes of the internal conductor 40 and the external conductor 42 is substantially constant. When dimensioning these components, use is made of the realization that the impedance in a coaxial conductor system with a plurality of components is substantially dependent on the diameter of the respective components and on the dielectric constant of the medium filling the respective intermediate spaces. For example, in the region of the bushing 46 there is a coaxial system formed by the internal conductor 40, the inner wall of the flange element 44 and the annular air gap lying in between. In this region, the impedance of the conductor system is consequently dictated substantially by the outside diameter d of the internal conductor 40, the diameter D of the opening 46 and the dielectric constant of the medium filling the air gap, that is of air. In the space region lying directly above or below that, the local impedance of the conductor system is dictated on the other hand by the outside diameter d of the internal conductor 40, the outside diameter of the ceramic rings 54 surrounding the latter, taking into account its dielectric constant $\epsilon$, the inside diameter $D_2$ of the external conductor 42 and the dielectric constant of air in the region of the air gap between the ceramic ring 54 and the external conductor 42.

In each space region, the respective diameters of the individual components are chosen with consideration of the respectively relevant dielectric constant in such a way that the resultant impedance in the longitudinal direction of the internal conductor 40 is virtually constant. In order in this case to provide adequate space for fitting the mechanical components in the region of the bushing through the flange element 44, the internal conductor 40 and the external conductor 42 are respectively widened in their cross sections in the vicinity of the flange element 44 in comparison with the dimensioning of the actual signal line 6, as can be seen in FIG. 2. The widening of the cross sections, in particular in the region 66 of conical cross-sectional form, is in this case configured in such a way that the impedance remains unchanged even in spite of the change in the geometrical conditions.

If required, the lead-through bushing 8 may be configured in the same way as the lead-through bushing 18.

I claim:

1. An electrical lead-through bushing, comprising:
   a flange element having a first side and a second side;
   an internal conductor and an external conductor surrounding said internal conductor together extending through said flange element;
   said internal conductor and said external conductor surrounding said internal conductor defining a first space region on said first side of said flange element and a second space region on said second side of said flange element; and
   a plurality of sealing rings sealing said first space region off with respect to said second space region.

2. The electrical lead-through bushing according to claim 1, wherein said sealing rings are metal sealing rings.

3. The electrical lead-through bushing according to claim 1, wherein said internal conductor is prestressed by said flange element in a region where said internal conductor passes therethrough.

4. The electrical lead-through bushing according to claim 3, which comprises a plurality of ceramic rings supporting means for applying a prestress on said flange element on a force side thereof.

5. The electrical lead-through bushing according to claim 1, wherein said flange element is integrally formed in one piece on said external conductor.

6. The electrical lead-through bushing according to claim 1, wherein said external conductor and said internal conductor are dimensioned in a cross section thereof to form a conductor system with a substantially constant impedance in a longitudinal direction.

7. In a time domain reflectometry apparatus, the electrical lead-through bushing according to claim 1 combined with a measuring system for ascertaining a characteristic positional value of a boundary layer.

8. In a nuclear installation, the electrical lead-through bushing according to claim 1 in combination with a time domain reflectometry measuring system for ascertaining a fill level in a reactor pressure vessel of the nuclear installation.

9. The electrical bushing according to claim 1 installed in a pressure-tight wall and configured for passing on a measuring pulse through the pressure-tight wall.

10. The electrical bushing according to claim 9, wherein the pressure-tight wall is a containment of a nuclear installation.

* * * * *